United States Patent [19]
Montgomery

[11] 3,955,730
[45] May 11, 1976

[54] CARRIER BAG FOR ATTACHMENT TO DROP HANDLEBARS OF A BICYCLE

[75] Inventor: Joseph S. Montgomery, Stamford, Conn.

[73] Assignee: Cannondale Corporation, Stamford, Conn.

[22] Filed: Jan. 31, 1975

[21] Appl. No.: 546,140

[52] U.S. Cl. .............................. 224/36; 224/30 A; 224/31; 224/41; 150/28 R; 150/31
[51] Int. Cl.² ...................... B62J 7/06; A45C 13/04
[58] Field of Search ............... 224/36, 35, 33, 32 A, 224/30 R, 30 A, 31, 39 R, 41, 42.46 R; 150/28 R, 2.1, 46, 31

[56] References Cited
UNITED STATES PATENTS

| | | | |
|---|---|---|---|
| 470,878 | 3/1892 | Mease | 224/36 |
| 2,438,408 | 3/1948 | Mace | 150/31 X |
| 3,888,397 | 6/1975 | Kolzumi | 224/35 |

FOREIGN PATENTS OR APPLICATIONS 24,828   11/1907   United Kingdom ................... 224/36

Primary Examiner—Robert J. Spar
Assistant Examiner—Jerold M. Forsberg
Attorney, Agent, or Firm—Brumbaugh, Graves, Donohue & Raymond

[57] ABSTRACT

A carrier bag for attachment to drop handlebars of a bicycle comprises an enclosure of semi-flexible material and a substantially rigid frame of inverted U-shape received within the enclosure, the frame including a base portion in engagement with a top wall and depending leg portions extending downward from the base along at least the upper portions of respective end walls of the bag. The elements for attaching the bag to the bicycle are attached to each leg of the frame, and a load in the bag is transmitted into the rigid frame from the enclosure and is, in turn, transmitted from the frame to the handlebars.

3 Claims, 3 Drawing Figures

U.S. Patent   May 11, 1976   3,955,730
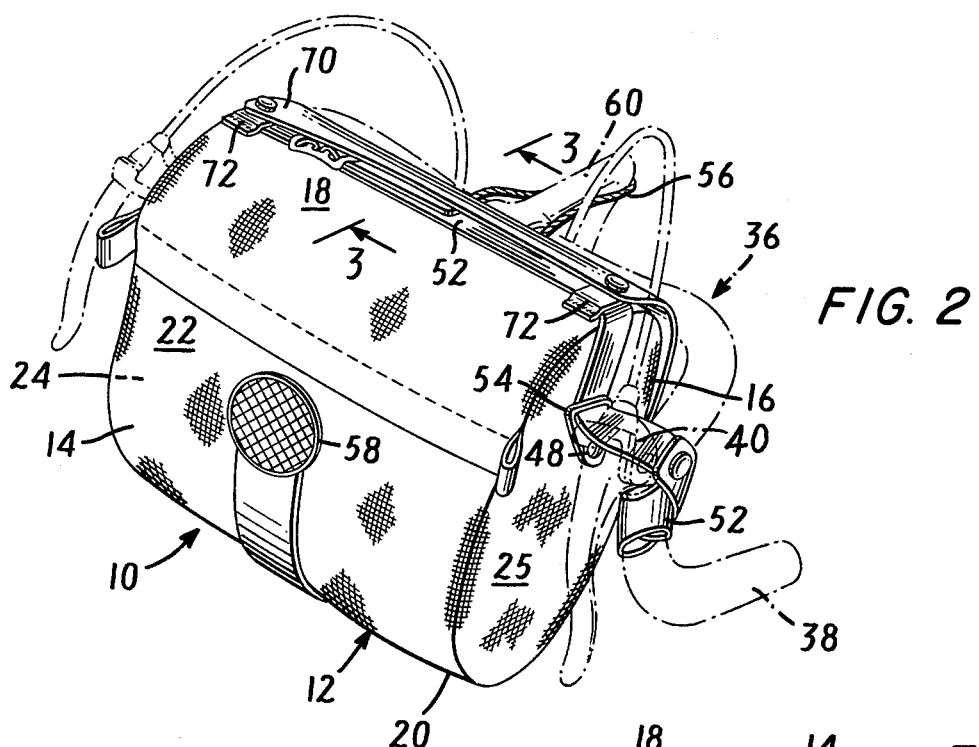
FIG. 2
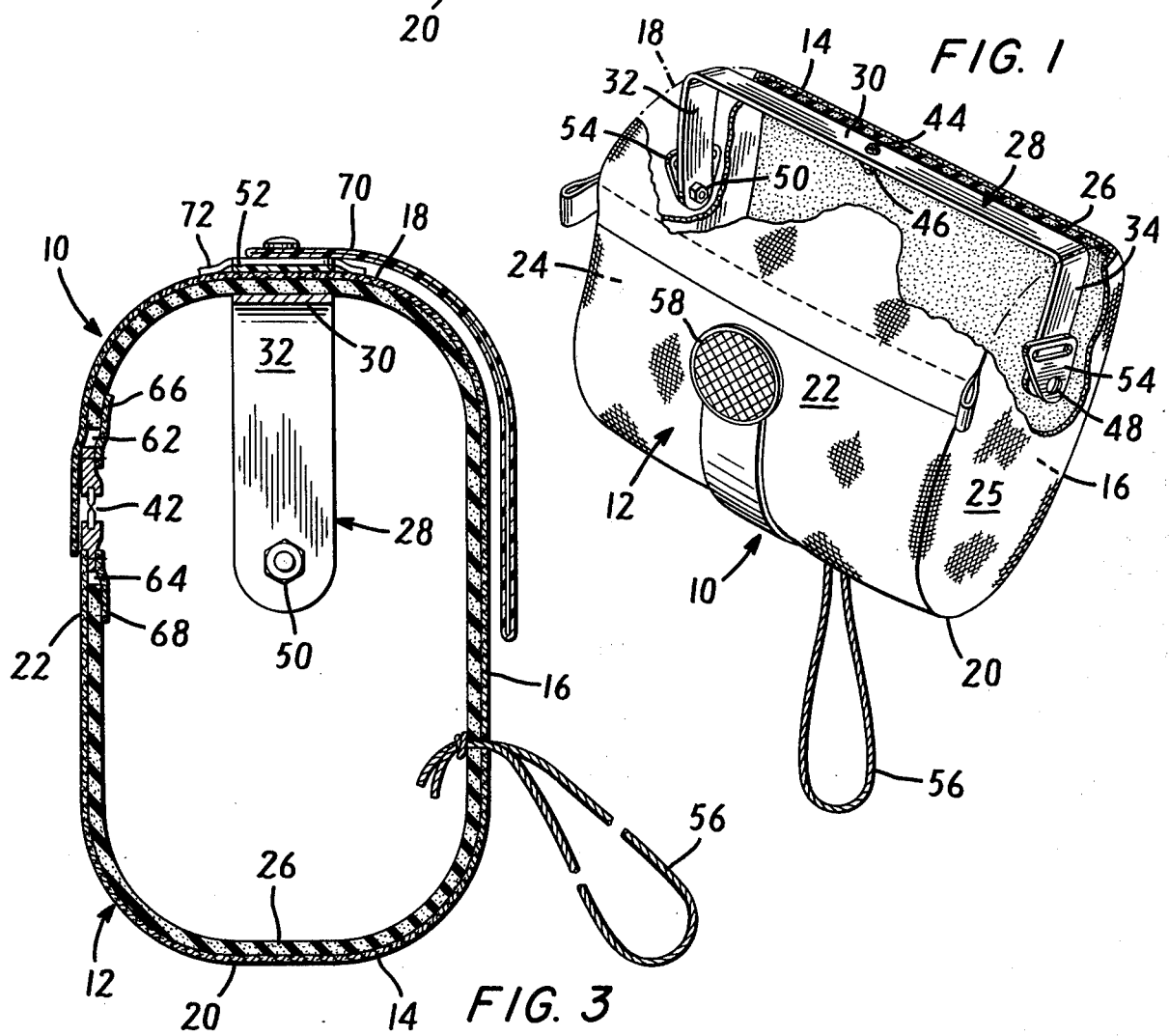
FIG. 1
FIG. 3

CARRIER BAG FOR ATTACHMENT TO DROP HANDLEBARS OF A BICYCLE

BACKGROUND OF THE INVENTION

This invention relates to lightweight, durable carrier bags for attachment to drop, i.e., racing type, handlebars of a bicycle.

One type of known drop handlebar bag which the assignee of the present application has marketed in the past comprises straps fastened to ends of the top of the bag which are looped around the handlebar. Because the fastening straps are attached to the top wall of the bag, the bag hangs low from the handlebars. In instances in which the bag is carrying rather heavy loads, the bag tends to become misshapen and, in severe cases, can sag and possibly contact the front wheel. Another disadvantage of such a low hung bag is that its overall height is limited to the distance between the handlebars and the front wheel.

SUMMARY OF THE INVENTION

There is provided, in accordance with the present invention, an improvement in lightweight carrier bags for attachment to drop handlebars of a bicycle that significantly increases the size and load carrying capability of the bag and makes it virtually impossible, even under extremely heavy loading, for the bag to become so misshapen as to present any problem in use. More particularly, the improvement involves the provision of a support system for the bag which includes a substantially rigid frame of inverted U-shape received within an outer enclosure, the frame including a base portion extending generally medially along and in engagement with a top wall of the enclosure and depending leg portions extending downward from the base along at least upper portions of respective end walls of the enclosure. The support system further comprises straps or other suitable means for attachment of the bag to the handlebars, the straps or other means being connected to the frame. Thus, the load in the bag is transmitted from the enclosure to the frame and from the frame to the straps or other means and from the straps or other means to the handlebar. Since the load in the enclosure is transmitted through the walls of the enclosure to the top wall, the load generally hangs from the frame.

Another aspect of the present invention involves attaching a carrier bag to brake lever housings located on the handlebars in a manner that enables the size of the bag to be increased and ensures minimum interference with the operation of the bicycle. This aspect of the support system involves attaching the straps, or other attaching means, which are, of course, located on the outside of the enclosure and are adapted to be attached to the brake lever housings, to points on each end leg of the frame that are a substantial distance below the top of the bag. By connecting the mounting straps to the lower part of each leg, for example, near the center of the end walls, the top wall of the bag is raised to an elevation above the handlebars, thereby increasing the distance between the top wall and the front wheel which, in turn, permits the overall height of the bag to be increased. Also, attaching the straps to the brake lever housings permits the handlegrips and other portions of the handlebars to be free of straps or other means for attachment of the bag to the handlebars. A swivel bracket may also be provided for connecting the strap to each leg of the frame. The support system may also include a restraining cord connected to a lower portion of a back wall of the enclosure and adapted to be hooked over a neck portion of the handlebars to prevent the bag from swaying or moving forward and outward.

For a better understanding of the invention, reference may be made to the following description of an exemplary embodiment of the invention, taken in conjunction with the figures of the drawings.

DESCRIPTION OF THE DRAWINGS

FIG. 1 is a pictorial view of the bag taken from the front and somewhat above, portions of the enclosure being broken away to show the rigid frame more clearly;

FIG. 2 is a pictorial view of the bag of FIG. 1 taken from the front and somewhat above; and FIG. 3 is an end cross-sectional view of the bag of FIGS. 1 and 2, the view being taken generally along a plane represented by the lines 3-3 of FIG. 2 and in the direction of the arrows.

DESCRIPTION OF AN EXEMPLARY EMBODIMENT

As shown in FIG. 1, a bag, which is designated generally by the reference numeral 10 in the drawing, comprises an outer enclosure 12 which includes an outer member 14 made of a lightweight nylon fabric with one side coated with polyurethane to render it waterproof and an inner stiffener or liner (described below). The outer member 14 includes a back wall 16, a top wall 18, a bottom wall 20, a front wall 22 and end walls 24 and 25. It will be evident to those skilled in the art that the construction of the outer enclosure 12 may take various specific forms. As shown, the bag 10 may be composed of a single main panel of fabric that forms the front, top, bottom and back walls and separate end panels, the respective end panels being stitched around their perimeters to the ends of the main panel of the bag. A protective shape-giving liner 26 of a semi-flexible, resilient, compressible polymeric foam is received within the bag 10 in coextensive relation with the front wall 22, top wall 18, back wall 16 and bottom wall 20 of the outer member 14. Reference may be made to U.S. appln. Ser. No. 380,458, filed July 18, 1973, now U.S. Pat. No. 3,903,944 for a further description of the liner and its function in lightweight utility bags. Reference is also made to copending U.S. patent applications Ser. No. 546,017 and 546,141 filed January 31, 1975.

The bag 10 further includes a support system in the form of a substantially rigid frame 28 made, preferably, of a lightweight, strong material such as aluminum. The frame includes a base portion 30 extending along and in engagement with the top wall 18 and depending leg portions 32 and 34 extending downward from the base portion 30 along and in engagement with at least the upper portions of respective end walls 24 and 25. The base portion is fastened to the outer enclosure 12 by a screw and a nut 44 and 46. Similarly, each leg 32 and 34 is fastened to the outer enclosure 12 by screws and nuts 48 and 50.

As shown in FIG. 2, the bag 10 may be attached to drop handlebars 36 of a conventional, well-known type that are mounted over the front wheel of a bicycle. Only a portion of the handlebars 36 is illustrated in FIG. 2, namely a neck portion 60 for attaching the handlebars 36 to the bicycle frame (not shown), handlegrips 38 and brake lever housings 40. Because the bag 10 is mounted between the drop portions of the handlebars, the distance between the end walls 24 and 25 must be less than the distance between the drop portions of the handlebars.

An opening for the outer enclosure 12 extends longitudinally along the front wall 22 at a location near the top of the bag 10 and is provided with a zipper closure 42 (see FIG. 3). Pockets 62 and 64 constituted by strips 66 and 68, respectively, of fabric extending longitudinally along the front wall 22 above and below the opening are stitched on the interior of the outer enclosure 12. The liner 26 is retained within the outer enclosure 12 by reception of its respective longitudinal edges within the respective pockets 62 and 64 adjacent the opening to the outer enclosure 12.

The bag also includes a strap 52 or other suitable means for attachment of the bag to the bicycle handlebars that is connected to the lower part of each leg 32 and 34 of the frame 28. The strap 52 is wrapped around and snap-fastened around the brake lever housings 40. Swivel brackets 54 may also be provided for connecting the strap 52 to each leg 32 and 34 of the frame 28. The support system may also include a restraining cord 56 connected to the lower portion of the back wall 16 and adapted to be hooked over the neck portion 60 of the handlebars 36 to prevent the bag 10 from swaying or moving forward and outward. Other advantageous features include the provision of a reflector 58 located on the front wall 22 of the outer enclosure 12 and a map case 70 snap-fastened to strips 72 of webbing (e.g., nylon) which, in conjunction with the strap 52, form a carrier strap for the bag.

The above-described embodiment of the invention is intended to be merely exemplary, and numerous variations and modifications of it will be apparent to those skilled in the art without departing from the spirit and scope of the invention. All such variations and modifications are intended to be included within the scope of the invention as defined in the appended claims.

I claim:

1. A carrier bag for mounting on the brake lever housings located on the drop handlebars of a bicycle or the like comprising an outer enclosure of semi-flexible material having a top wall, a bottom wall, left and right end walls and front and back walls defining an enclosed volume, the distance between the end walls being less than the distance between the drop portions of the handlebars, a substantially rigid frame member of inverted U-shape received within the outer enclosure, the frame member including a base portion extending generally medially along and in engagement with the top wall and depending leg portions extending downward from the base portion along at least the upper portions of respective end walls, means connected to each leg of the frame and adapted to be connected to a respective brake lever housing, wherein the connecting means is connected to each leg of the frame substantially below the top wall of the enclosure thereby positioning the top wall of the enclosure above the handlebars and the bottom wall above and out of engagement with the front wheel of the bicycle, and a restraining cord connected to the lower portion of the back wall of the outer enclosure and adapted to be hooked over a neck portion of the handlebars to prevent sway.

2. A carrier bag according to claim 1 wherein the frame member is a single strip of substantially rigid material and is secured to at least the top wall of the enclosure.

3. A carrier bag according to claim 1 further comprising a swivel bracket for connecting the connecting means to each leg of the frame.

* * * * *